United States Patent
Lin

(10) Patent No.: US 11,036,414 B2
(45) Date of Patent: Jun. 15, 2021

(54) DATA STORAGE DEVICE AND CONTROL METHOD FOR NON-VOLATILE MEMORY WITH HIGH-EFFICIENCY GARBAGE COLLECTION

(71) Applicant: Silicon Motion, Inc., Jhubei (TW)

(72) Inventor: Ting-Han Lin, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/505,192

(22) Filed: Jul. 8, 2019

(65) Prior Publication Data

US 2020/0081620 A1 Mar. 12, 2020

Related U.S. Application Data

(60) Provisional application No. 62/728,134, filed on Sep. 7, 2018.

(30) Foreign Application Priority Data

Mar. 8, 2019 (TW) ................................. 108107913

(51) Int. Cl.
*G06F 3/06* (2006.01)
*G06F 12/1009* (2016.01)

(52) U.S. Cl.
CPC ............ *G06F 3/064* (2013.01); *G06F 3/0607* (2013.01); *G06F 3/0619* (2013.01); *G06F 3/0658* (2013.01); *G06F 3/0679* (2013.01); *G06F 12/1009* (2013.01); *G06F 2212/7211* (2013.01)

(58) Field of Classification Search
CPC ...... G06F 3/064; G06F 3/0607; G06F 3/0619; G06F 3/0658; G06F 3/0679; G06F 12/1009; G06F 2212/7211
See application file for complete search history.

(56) References Cited

U.S. PATENT DOCUMENTS

| | | | |
|---|---|---|---|
| 7,609,564 | B2 | 10/2009 | Blum |
| 8,040,744 | B2 | 10/2011 | Gorobets et al. |
| 8,205,036 | B2 | 6/2012 | Chen et al. |
| 8,225,028 | B2 * | 7/2012 | Kuo ..................... G06F 12/0246 711/103 |

(Continued)

FOREIGN PATENT DOCUMENTS

| | | |
|---|---|---|
| CN | 101645309 A | 5/2013 |
| CN | 104732153 A | 6/2015 |

(Continued)

*Primary Examiner* — Eric Cardwell
(74) *Attorney, Agent, or Firm* — McClure, Qualey & Rodack, LLP

(57) ABSTRACT

High-efficiency control technology for non-volatile memory is shown. A controller transfers valid data from a first source block to an active block in sections and, between segmented data transfers, the controller writes data issued by the host to the active block. When no second source block is waiting, the controller transfers a first amount of valid data from the first source block to the active block in each segmented data transfer. When a second source block is waiting, the controller transfers a second amount of valid data from the first source block to the active block in each segmented data transfer. The second amount is larger than the first amount and thereby the data transfer for the first source block speeds up.

18 Claims, 3 Drawing Sheets

(56) References Cited

U.S. PATENT DOCUMENTS

| | | | |
|---|---|---|---|
| 8,356,136 B2 | 1/2013 | Chang et al. | |
| 8,667,210 B2 | 3/2014 | Yeh | |
| 8,886,990 B2 | 11/2014 | Meir et al. | |
| 9,021,177 B2 | 4/2015 | Segal et al. | |
| 9,747,201 B2 | 8/2017 | Nguyen Tien et al. | |
| 2006/0155920 A1 | 7/2006 | Smith et al. | |
| 2006/0161722 A1 | 7/2006 | Bennett et al. | |
| 2007/0168632 A1 | 7/2007 | Zeevi et al. | |
| 2007/0234183 A1 | 10/2007 | Hwang et al. | |
| 2012/0084490 A1 | 4/2012 | Choi et al. | |
| 2012/0159051 A1* | 6/2012 | Hida | G06F 12/0246 711/103 |
| 2013/0173875 A1 | 7/2013 | Kim et al. | |
| 2016/0078966 A1* | 3/2016 | Li | G11C 16/349 714/723 |
| 2016/0188455 A1 | 6/2016 | Patel | |
| 2017/0199703 A1 | 7/2017 | Ravimohan et al. | |
| 2017/0221584 A1 | 8/2017 | Chen et al. | |
| 2018/0150390 A1 | 5/2018 | Chien et al. | |
| 2018/0165009 A1 | 6/2018 | Hsiao et al. | |
| 2018/0275887 A1 | 9/2018 | Yang et al. | |
| 2019/0108119 A1 | 4/2019 | Gholamipour et al. | |

FOREIGN PATENT DOCUMENTS

| | | |
|---|---|---|
| CN | 107817943 A | 3/2018 |
| TW | I604441 B | 11/2017 |
| TW | I613652 B | 2/2018 |
| TW | I615710 B | 2/2018 |
| TW | I627531 B | 6/2018 |

\* cited by examiner

DATA STORAGE DEVICE AND CONTROL METHOD FOR NON-VOLATILE MEMORY WITH HIGH-EFFICIENCY GARBAGE COLLECTION

CROSS REFERENCE TO RELATED APPLICATIONS

This Application claims the benefit of U.S. Provisional Application No. 62/728,134, filed on Sep. 7, 2018, the entirety of which is incorporated by reference herein.

This Application also claims priority of Taiwan Patent Application No. 108107913, filed on Mar. 8, 2019, the entirety of which is incorporated by reference herein.

BACKGROUND OF THE INVENTION

Field of the Invention

The present invention relates to control techniques for non-volatile memory.

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as a storage medium in a data storage device.

Non-volatile memory typically has its own specific storage characteristics. There is a need in the art for the development of control techniques for the specific storage characteristics of non-volatile memory.

BRIEF SUMMARY OF THE INVENTION

In accordance with an exemplary embodiment of the disclosure, a data storage device has a non-volatile memory and a controller. The controller allocates spare blocks of the non-volatile memory to provide an active block to write data issued by the host to the active block. The controller further uses the active block as a data transfer destination for valid data from a first source block of the non-volatile memory. The controller transfers valid data from the first source block to the active block in sections and, between segmented data transfers, the controller writes data issued by the host to the active block. When no second source block is waiting, the controller transfers a first amount of valid data from the first source block to the active block in each segmented data transfer. When a second source block is waiting, the controller transfers a second amount of valid data from the first source block to the active block in each segmented data transfer. The second amount is larger than the first amount.

In an exemplary embodiment, the controller increases the second amount when there is a third source block waiting with the second source block.

In an exemplary embodiment, the controller permits the data transfer from the second source block to the active block after finishing the data transfer from the first source block to the active block.

In an exemplary embodiment, the controller sets a section transfer amount for the first source block at the beginning of the data transfer of the first source block, to transfer each section of the first source block according to the section transfer amount.

In an exemplary embodiment, the controller estimates the ratio of the number of valid pages within the first source block to the number of spare pages within the active block. The number of valid pages within the first source block is x. The number of spare pages within the active block is y. The ratio is x:(y-x) which is equivalent to 1:n. The controller sets a calibration value, a, according to the total number of source blocks. When only the first source block needs data transfer, the controller sets the calibration value, a, to a default value. When more than the first source block need data transfer, the controller sets the calibration value, a, to be greater than the default value. According to the ratio of a:n, the controller transfers one section of the first source block and writes data issued by the host.

In an exemplary embodiment, the controller further sets a value M according to the reaction time of programming the non-volatile memory. After the controller transfers a*M pages of valid data from the first source block to the active block, n*M pages of write data issued by the host is permitted to fill the active block.

In an exemplary embodiment, after estimating the values a*M and n*M, the controller transfers the first a*M pages of valid data from the first source block to the active block and, after the transfer of the first a*M pages, permits the first n*M pages of write data issued by the host to fill the active block.

In an exemplary embodiment, a source block selection is based on whether the number of spare blocks is less than a threshold amount, whether an error correction failure occurs, or whether early move or wear-leveling is requested.

In an exemplary embodiment, prior to closing the active block by writing end-of-block (EOB) information, the controller releases the first source block whose valid data has been completely transferred to the active block.

In addition to a controller, the control of a non-volatile memory may be implemented by other structures. In an exemplary embodiment, a control method for non-volatile memory may be realized according to the aforementioned concepts, which includes the following steps: operating a non-volatile memory as requested by a host; allocating spare blocks of the non-volatile memory to provide an active block to write data issued by the host to the active block; using the active block as a data transfer destination for valid data from a first source block of the non-volatile memory; transferring valid data from the first source block to the active block in sections and, between segmented data transfers, writing data issued by the host to the active block; when no second source block is waiting, transferring a first amount of valid data from the first source block to the active block in each segmented data transfer; and when a second source block is waiting, transferring a second amount of valid data from the first source block to the active block in each segmented data transfer. The second amount is larger than the first amount.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
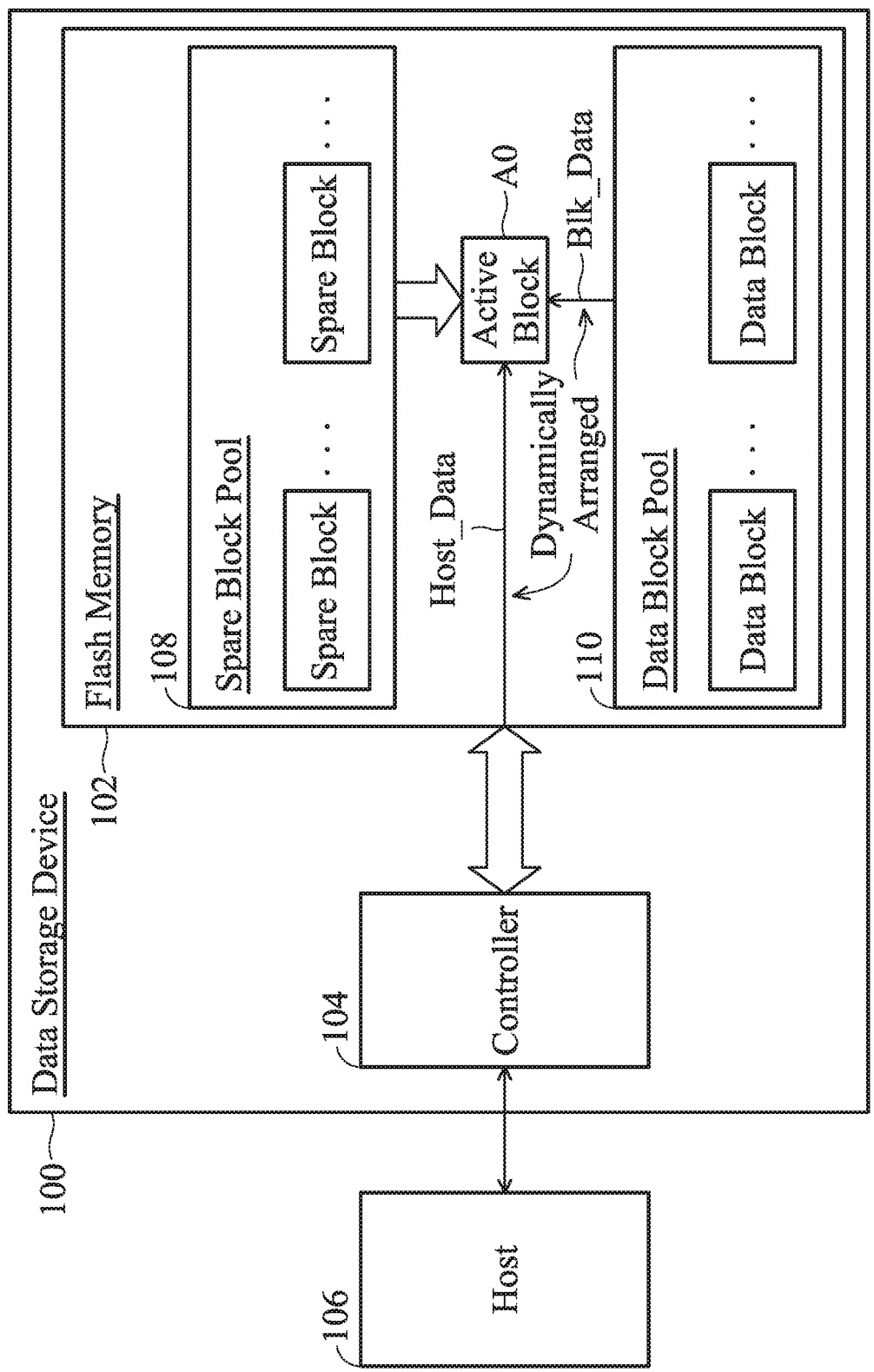
FIG. 1 is a block diagram depicting a data storage device 100 in accordance with an exemplary embodiment of the disclosure.

FIG. 1 is a block diagram depicting a data storage device 100 in accordance with an exemplary embodiment of the disclosure. The data storage device 100 includes a flash memory 102 and a controller 104. A host 106 accesses the flash memory 102 through the controller 104. The controller 104 receives and executes write commands from the host 106. To optimize the storage of the flash memory 102, the controller 104 further involves user data transfer within the flash memory 102 without commands from the host 106.

A flash memory has its own special storage characteristics, as described below.

The host 106 distinguishes user data by logical address (e.g., logical block address LBA or global host page number GHP . . . etc.). The physical space in the flash memory 102 is divided into a plurality of blocks. Each block includes a plurality of pages. Each page includes N sectors, where N is an integer greater than 1, such as: 4. A 16 KB page may be divided into four sectors, each sector is 4 KB. In an exemplary embodiment, a block is allocated from a low to high page number to store user data.

In an exemplary embodiment, a data storage device adopts a multi-channel accessing technology. Blocks accessed through different channels may be managed as one super block, and pages of the different blocks may be managed as one super page. The data storage device managed in the units of super block (or super page) therefore has improved data throughput.

For storage of user data, the data storage device records the mapping between logical address of the user data and physical address storing the user data in a logical-to-physical mapping table (L2P Table).

The storage space in the flash memory needs to be erased before being allocated again to store data. The minimum unit of erasure is a block. There are data blocks, active blocks, and spare blocks. An active block may be selected from the spare blocks to store user data. When full, the active block is closed (e.g., by writing of EOB (end of block) information) and changed to a data block. As the user data is updated, old user data in the data blocks are invalidated. When only invalid data remains, a data block is erased and changed to a spare block. In another exemplary embodiment, the block erasure is performed later. A block in which only invalid data remains is first changed to a spare block and is erased when selected to serve as an active block.

The control of a flash memory involves data transfer between blocks, including data transfer for garbage collection and data transfer for purposes other than garbage collection. When the number of spare blocks is not enough (e.g. lower than a threshold number TH1), garbage collection is required. In an exemplary embodiment, sparse pieces of valid data that remain in some blocks (called source blocks) may be collected in an active block (called a destination block). After garbage collection, source blocks are released, thereby increasing the number of spare blocks.

Data transfer for purposes other than garbage collection may be performed when there is a transfer requirement. In an exemplary embodiment, a data block containing ECC (error checking and correction) failed data may be regarded as a source block and the readable data is rescued and transferred to another block. In an exemplary embodiment, a data block read too frequently may be also regarded as a source block. Because the frequent reading may damage the data retention capability of a data block, an early move action is required to transfer data to another block. In an exemplary embodiment, data transfer may be performed because of wear leveling. For example, a block with a low read count may be regarded as a source block. Data in the source block may be moved to an active block (i.e. a destination block) that has a high erase count, thereby releasing rather than freezing the rarely used source block. In an exemplary embodiment, the concept of wear leveling is combined with garbage collection. Based on the wear leveling concept, valid data scattered on the source blocks is moved to an active block (destination block) having a high erase count.

It should be noted that the data transfer is preferably implemented by copying data to the destination.

This disclosure proposes a high-efficiency scheme for the valid data transfer. Once there is a demand for data transfer (e.g., due to garbage collection, ECC failure, early move, wear-leveling action, or other), the techniques of the disclosure may be adopted.

In FIG. 1, the flash memory 102 has a pool 108 of spare blocks and a pool 110 of data blocks. When the host 106 issues a write command or the controller 104 starts a data transfer procedure, the controller 104 selects one spare block from the spare block pool 108 for use as an active block A0. Accordingly, the number of spare blocks of the spare block pool 108 is reduced. User data is filled in the active block A0. After the active block A0 is closed and becomes a data block, the number of data blocks increases.

In a flash memory, an active block (labeled A0) is typically allocated to receive user data from a host which is typically issued through a write command (referring to the host data path Host_Data for the host 106 to write user data). Instead of additionally using another active block A1 (which is distinguished from active block A0) to store user data obtained from a source block for data transfer, the controller 104 of the disclosure also regards the active block A0 as the destination for the data transfer. When a request for a data transfer (e.g., due to garbage collection, ECC failure, early move, wear leveling, and so on) occurs, user data obtained from a source block is collected in the active block A0 (referring to the data transfer path Blk_Data for data transfer). In particular, this disclosure allows the valid data of the same block to be segmented into multiple sections and moved to the active block A0 in sections rather at one time. The disclosure adaptively sets a section transfer amount for the different source blocks. The more data blocks require data transfer, the higher the section transfer amount is set. The data amount written to the active block A0 by the host 106 through the host data path Host_Data and the data amount transferred to the active block A0 through the data transfer path Blk_Data are dynamically arranged. This technique is discussed in more detail below.

Compared with conventional technology which uses the active block A0 and the active block A1 to separate user data issued by the host 106 from the transferred user data, the design of the disclosure has several advantages and is described below.

In the disclosure, the active block A0 is not limited to store user data issued by the host 106 through a write command. The active block A0 can also store user data transferred from the source block, and thereby reducing the waste of spare blocks.

To deal with a sudden power failure, the active block A1 that has not been closed is abandoned during a sudden power-off recovery (SPOR) procedure for data reliability. Source blocks are accessed during the SPOR procedure to provide reliable user data. Therefore, as long as the active block A1 has not been closed, all source blocks of the data transfer must be retained and cannot be released. The aforementioned design obviously drags down the recycling of source blocks. The number of spare blocks cannot be increased over time. Other types of data transfer may be induced.

Compared with conventional technology which uses the active block A1 as a destination block for data transfer, this disclosure uses the active block A0 as a destination block for data transfer. The active block A0 is not discarded during the SPOR procedure. There is no need to maintain the source blocks for the SPOR procedure. The source blocks are released right after the data transfer and, accordingly, the number of spare blocks increases, which solves the problem due to the active block A1.

According to the prior art, dummy data is filled to the active block A1 (that works as the destination block for data transfer) to close the active block A1 early. The data storage capacity, therefore, is reduced. The erasure frequency is increased, which shorten the life of flash memory. In contrast, the active block A0 is used as the destination block for data transfer in this disclosure. The writing of dummy data is avoided, and the above problems are overcome.

In an exemplary embodiment, the controller 104 must finish transferring valid data from the earlier source block to the active block A0 before transferring valid data from the later source block to the active block A0. The data transfer may be performed due to garbage collection or other purposes.

In the disclosure, the valid data of the same source block is moved to the active block A0 in sections, interspersed with commands from the host 106. For example, between the segmented data transfer, user data issued by the host 106 may be written to the active block A0. There may be a proportional relationship between the valid data transfer and the writing of the user data issued by the host 106. The disclosure adaptively sets the proportional relationship. When not only one source block has the data transfer demand, a section transfer amount is increased to finish the valid data transfer of the current source block as soon as possible to cope with the next source block.

In FIG. 1, the user data issued by the host 106 is written to the active block through the host data path Host_Data. Data transfer (due to garbage collection, error correction failure, early move, wear leveling, etc.) uses the active block A0 as a data transfer destination and corresponds to a data transfer path Blk_Data. The data transfer from any source block selected from the data block pool 110 to the active block A0 should be interpreted as using the data transfer path Blk_Data. This disclosure dynamically arranges the use of the host data path Host_Data and the data transfer path Blk_Data.

In an exemplary embodiment, after the data transfer of an earlier source block is completed, the controller 104 permits the data transfer of another source block which also uses the active block A0 as the data transfer destination. For example, after the garbage collection of a source block is completed, the controller 104 permits data transfer of another source block for purposes other than garbage collection (due to garbage collection, error correction failure, early move, wear leveling, etc.) and still use the active block A0 as the data transfer destination. In another exemplary embodiment, after the data transfer (not for garbage collection) of a source block is completed, the controller 104 permits data transfer (not for garbage collection neither) of another source block and still use the active block A0 as the data transfer destination. In this manner, the number of spare blocks has a chance to be fully supplemented (more than one block may be released) before the active block A0 is closed (e.g. before the writing of EOB (end of block) information is completed).

In an exemplary embodiment, the valid data of the same source block is transferred to the active block A0 in sections. Between the sections, the controller 104 permits writing the user data issued by the host 106 to the active block A0, or operating the flash memory 102 in response to the read commands issued by the host 106. The length between two sections may depend on the data amount issued by the host 106 to be written to the active block A0. In another exemplary embodiment, the length between two sections may depend on a timer. Between two sections, another block may need data transfer. The controller 104 must finish the data transfer of all sections of the current source block before processing the data transfer of another source block.

In an exemplary embodiment, the controller 104 estimates the ratio of valid data within the source block to empty space remaining in the active block A0. According to the ratio, the controller 104 sets a section transfer amount to transfer each section of valid data. According to the ratio, the controller 104 further sets a write data amount between two sections that allows the host 106 to fill the active block A0.

There may be more than one source block needs data transfer. In an exemplary embodiment, the aforementioned ratio is dynamically adjusted. The section transfer amount of the current source block, therefore, is adjusted. In an exemplary embodiment, there are two source blocks need data transfer. There are x pages of valid data within the first source block. The active block A0 has y page of spare space. A ratio, x:(y-x), is estimated, which is equivalent to 1:n. In the exemplary embodiment, the ratio is adjusted to a:n, where the calibration value, a, is greater than a default value. For example, the normal default is 1, and the calibration value, a, is 2. Considering the reaction time of programming the flash memory 102 (writing data as requested by the host 106 or transferring data between blocks), a data transfer strategy is developed. Every time a*M pages of valid data are transferred from the first source block to the active block A0 (through the data transfer path Blk_Data), n*M pages of write data issued by the host 106 (through the host data path Host_Data) are written to the active block A0. Because the calibration value, a, is larger than the default value, the valid data of the first source block is transferred to the active block A0 early. The controller 104 performs the valid data transfer of the second source block in time. The controller 104 estimates a new ratio of the valid data amount within the second source block to the empty space remaining in the active block A0. Again, the controller 104 checks whether other source blocks waiting for data transfer and, accordingly, adjusts the ratio. The data transfer strategy specifically for the second source block is performed according to the adjusted ratio.

In an exemplary embodiment, not only the second source block is waiting when setting the data transfer strategy for the first source block. There is a third source block also waiting for data transfer. Thus, the calibration value, a, is set to a larger value in comparison with the example only having the first and second source blocks waiting for data transfer.

The reaction time of the programming (including writing issued by the host 106 and data transfer from a source block) is affected by a variety of factors. In this disclosure, the reaction time is specifically considered in the design, and the aforementioned value, M, is set. In an exemplary embodiment, one programming procedure programs M pages and thereby the writing of the flash memory 102 is optimized. For example, before the acknowledge message due to the programming of the first M pages, the second M pages may be cached to the controller 104, waiting to be write to the flash memory 102. The operational performance of programming M pages in one programming procedure is much better than programming just one page in each programming procedure.

In an exemplary embodiment, the controller 104 gives the data transfer higher priority than writing data issued by the host 106. For example, once there is a source block that meets the data transfer requirements, the controller 104 evaluates a data transfer strategy, and transfers the first section of data prior to storing the write data issued by the host 106. This design ensures that the same source block is collected in the same active block A0.

Figure 2:
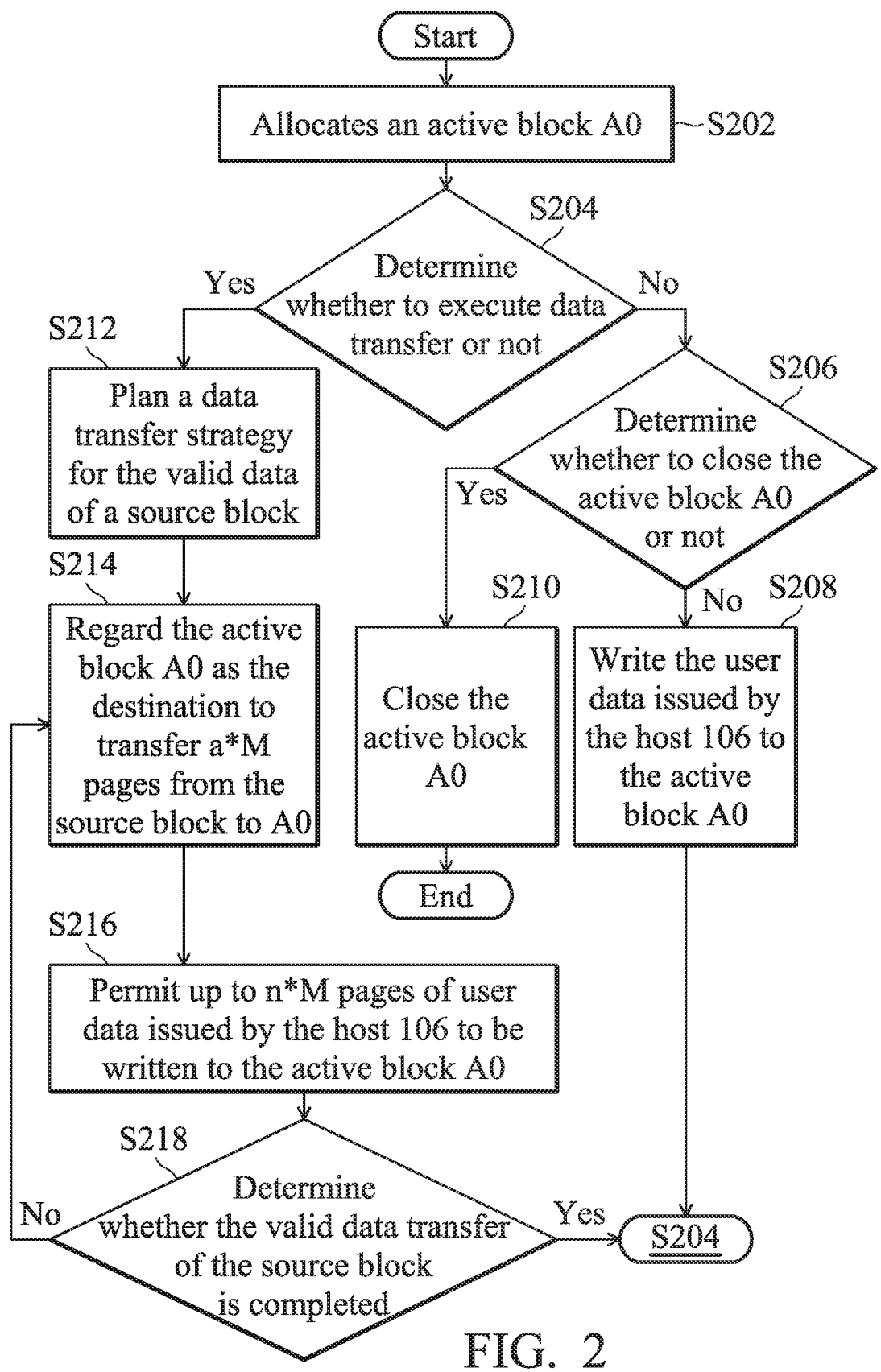
FIG. 2 shows a flowchart illustrating data transfer within the flash memory 102 in accordance with an exemplary embodiment of the present invention.

FIG. 2 shows a flowchart illustrating data transfer within the flash memory 102 in accordance with an exemplary embodiment of the present invention.

In step S202, the controller 104 allocates an active block A0. The controller 104 selects one spare block from the pool 108 of spare blocks as the active block A0.

In step S204, the controller 104 determines whether to execute data transfer or not. If yes, step S212 is performed, and if not, step S206 is performed. The controller 104 starts (executes) data transfer when a preset condition is satisfied. For example, the preset condition is judged by determining whether the number of spare blocks is less than a threshold number TH1, or whether an error correction failure, early move or wear leveling occurs.

In step S206, the controller 104 determines whether to close the active block A0 or not. If yes, step S210 is performed, and if not, step S208 is performed. When the active block A0 still has spare space to store data, the controller 104 does not close the active block A0.

In step S208, the controller 104 writes the user data issued by the host 106 to the active block A0, and then returns to step S204. According to the procedure of FIG. 2, the controller 104 first executes step S204, and then executes step S206 and step S208/S210, which means according to the controller 104 the data transfer is in a higher priority than the writing of user data issued by the host 106. In another exemplary embodiment, the controller 104 writes user data issued by the host 106 prior to performing step S204, which means that the writing of user data issued by the host 106 is in a higher priority than the data transfer from a source block to the active block A0.

In step S210, the controller 104 closes the active block A0. When the active block A0 has no spare space for data storage, the controller 104 closes the active block A0 and writes EOB information to the last page of the active block A0.

When it is determined in step S204 that there is a demand for data transfer, the flow proceeds to step S212 to plan a data transfer strategy for the valid data of a source block. In addition to checking the valid data amount of the source block and the empty space remaining in the active block A0, the controller 104 also checks whether there are more source blocks to be moved. The controller 104, therefore, evaluates a data transfer strategy. For example, each time a*M pages of valid data are transferred from the source block to the active block A0, n*M pages of write data issued by the host 106 are written to the active block A0. Step S214 and step S216 are repeated to complete the data transfer strategy.

In step S214, the active block A0 is regarded as the destination block for data transfer, and a*M pages of data is transferred from the source block to the active block A0. In step S216, the active block A0 is switched back to store user data issued by the host 106. The controller 104 permits up to n*M pages of user data issued by the host 106 to be written to the active block A0. In step S218, the controller 104 determines whether the valid data transfer of the source block is completed. If not, the flow returns to step S214 to continue the valid data transfer of the following a*M pages of the source block. If it is determined in step S218 that the valid data transfer of the source block is completed, the flow proceeds to step S204 and the subsequent steps to plan how to use the active block A0 as the data transfer destination for another source block.

In another exemplary embodiment, step S216 may count time. When the time limit is exceeded in step S216, the flowchart proceeds to step S218.

Figure 3:
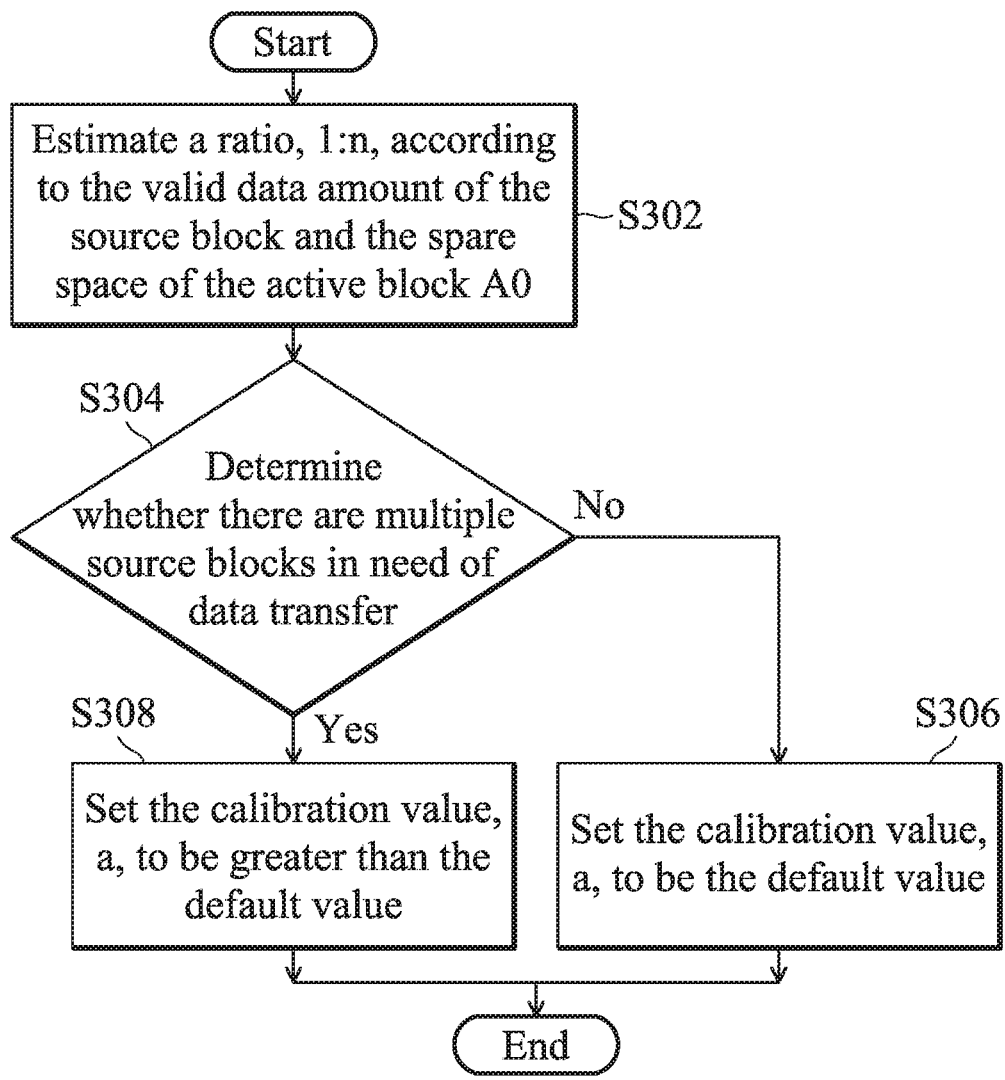
FIG. 3 shows the detailed steps of step S212 in accordance with an exemplary embodiment of the disclosure, wherein a number, a*M, is evaluated for step S214 as the number of pages transferred in one section, and another number, n*M, is evaluated for step S216 as the number of pages requested by the host 106 and inserted between the segmented data transfer.

FIG. 3 shows the detailed steps of step S212 in accordance with an exemplary embodiment of the disclosure. A number, a*M, is evaluated for step S214 as the number of pages transferred in one section. Another number, n*M, is evaluated for step S216 as the number of pages requested by the host 106 and inserted between the segmented data transfer.

In step S302, the controller 104 estimates a ratio, 1:n, according to the valid data amount of the source block and the spare space of the active block A0. For example, the source block has x valid pages. The active block A0 has y spare pages. According to step S302, the controller 104 estimates a ratio, x:(y-x), which is equivalent to 1:n.

In step S304, the controller 104 determines whether there are multiple source blocks in need of data transfer. If no, the flow proceeds to step S306. The controller 104 sets the calibration value, a, to be the default value (e.g., 1), which means that there is no need to accelerate the data transfer. On the other hand, if there are multiple source blocks in the need of data transfer, the flow proceeds to step S308. The controller 104 sets the calibration value, a, to be greater than the default value. For example, the calibration value may be set to 2 to speed up the data transfer. The more source blocks are waiting for data transfer, the larger the calibration value, a, is.

The ratio, 1:n, estimated in step S302 and the calibration value, a, estimated in the flow of FIG. 3 are applied to steps S214 and S216. The number of pages transferred in one section is a*M. The number of pages requested by the host 106 and inserted between the segmented data transfer is n*M.

The user may be in the habit of repeatedly powering down and up a device (referred to as power cycling). For example, a mobile phone user may flip the phone cover to check messages. A lot of spare blocks are consumed in power cycling. A need for garbage collection arises. It is also possible that a particular block may be read too frequently, resulting in a demand of data transfer due to ECC failure, early move, or wear leveling. According to the disclosure, the insufficient spare blocks are replenished in time.

The operations that the controller 104 performs on the flash memory 102 may be implemented by other structures. Any technology that dynamically uses the active block A0 for different purposes (e.g., dynamically switching between the host data path Host_Data and the data transfer path Blk_Data) should be considered as within the scope of the present invention. In this case, the control method of the non-volatile memory can be realized by the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, operating the non-volatile memory as requested by a host,
wherein:
the controller allocates spare blocks of the non-volatile memory to provide an active block to write data issued by the host to the active block;
the controller further uses the active block as a data transfer destination for valid data from a first source block of the non-volatile memory;
the controller transfers valid data from the first source block to the active block in sections and, between segmented data transfers, the controller writes data issued by the host to the active block;
when no second source block is waiting, the controller transfers a first amount of valid data from the first source block to the active block in each segmented data transfer;
when a second source block is waiting, the controller transfers a second amount of valid data from the first source block to the active block in each segmented data transfer; and
the second amount is larger than the first amount.

2. The data storage device as claimed in claim 1, wherein:
the controller increases the second amount when there is a third source block waiting with the second source block.

3. The data storage device as claimed in claim 1, wherein:
the controller permits the data transfer from the second source block to the active block after finishing the data transfer from the first source block to the active block.

4. The data storage device as claimed in claim 3, wherein:
the controller sets a section transfer amount for the first source block at the beginning of the data transfer of the first source block, to transfer each section of the first source block according to the section transfer amount.

5. The data storage device as claimed in claim 4, wherein:
the controller estimates a ratio of the number of valid pages within the first source block to the number of spare pages within the active block, where the number of valid pages within the first source block is x, the number of spare pages within the active block is y, and the ratio is x:(y-x) which is equivalent to 1:n;
the controller sets a calibration value, a, according to the total number of source blocks;
when only the first source block needs data transfer, the controller sets the calibration value, a, to a default value;
when more than the first source block need data transfer, the controller sets the calibration value, a, to be greater than the default value; and
according to a ratio of a:n, the controller transfers one section of the first source block and writes data issued by the host.

6. The data storage device as claimed in claim 5, wherein:
the controller further sets a value M according to the reaction time of programming the non-volatile memory;
after the controller transfers a*M pages of valid data from the first source block to the active block, n*M pages of write data issued by the host is permitted to fill the active block.

7. The data storage device as claimed in claim 6, wherein:
after estimating the values a*M and n*M, the controller transfers the first a*M pages of valid data from the first source block to the active block and, after the transfer of the first a*M pages, permits the first n*M pages of write data issued by the host to fill the active block.

8. The data storage device as claimed in claim 1, wherein:
a source block selection is based on whether the number of spare blocks is less than a threshold amount, whether an error correction failure occurs, or whether early move or wear-leveling is requested.

9. The data storage device as claimed in claim 1, wherein:
prior to closing the active block by writing end-of-block information, the controller releases the first source block whose valid data has been completely transferred to the active block.

10. A non-volatile memory control method, comprising:
operating a non-volatile memory as requested by a host;
allocating spare blocks of the non-volatile memory to provide an active block to write data issued by the host to the active block;

using the active block as a data transfer destination for valid data from a first source block of the non-volatile memory;

transferring valid data from the first source block to the active block in sections and, between segmented data transfers, writing data issued by the host to the active block;

when no second source block is waiting, transferring a first amount of valid data from the first source block to the active block in each segmented data transfer; and when a second source block is waiting, transferring a second amount of valid data from the first source block to the active block in each segmented data transfer, wherein the second amount is larger than the first amount.

11. The non-volatile memory control method as claimed in claim 10, further comprising:

increasing the second amount when there is a third source block waiting with the second source block.

12. The non-volatile memory control method as claimed in claim 10, further comprising:

permitting the data transfer from the second source block to the active block after finishing the data transfer from the first source block to the active block.

13. The non-volatile memory control method as claimed in claim 12, further comprising:

setting a section transfer amount for the first source block at the beginning of the data transfer of the first source block, to transfer each section of the first source block according to the section transfer amount.

14. The non-volatile memory control method as claimed in claim 13, further comprising:

estimating a ratio of the number of valid pages within the first source block to the number of spare pages within the active block, where the number of valid pages within the first source block is x, the number of spare pages within the active block is y, and the ratio is x:(y-x) which is equivalent to 1:n;

setting a calibration value, a, according to the total number of source blocks;

when only the first source block needs data transfer, setting the calibration value, a, to a default value;

when more than the first source block need data transfer, setting the calibration value, a, to be greater than the default value; and according to a ratio of a:n, transferring one section of the first source block and writing data issued by the host.

15. The non-volatile memory control method as claimed in claim 14, further comprising:

setting a value M according to the reaction time of programming the non-volatile memory, wherein, after transferring a*M pages of valid data from the first source block to the active block, n*M pages of write data issued by the host is permitted to fill the active block.

16. The non-volatile memory control method as claimed in claim 15, further comprising:

after estimating the values a*M and n*M, transferring the first a*M pages of valid data from the first source block to the active block and, after the transfer of the first a*M pages, permitting the first n*M pages of write data issued by the host to fill the active block.

17. The non-volatile memory control method as claimed in claim 10, wherein:

a source block selection is based on whether the number of spare blocks is less than a threshold amount, whether an error correction failure occurs, or whether early move or wear-leveling is requested.

18. The non-volatile memory control method as claimed in claim 10, further comprising:

prior to closing the active block by writing end-of-block information, releasing the first source block whose valid data has been completely transferred to the active block.

* * * * *